Patented Aug. 16, 1932

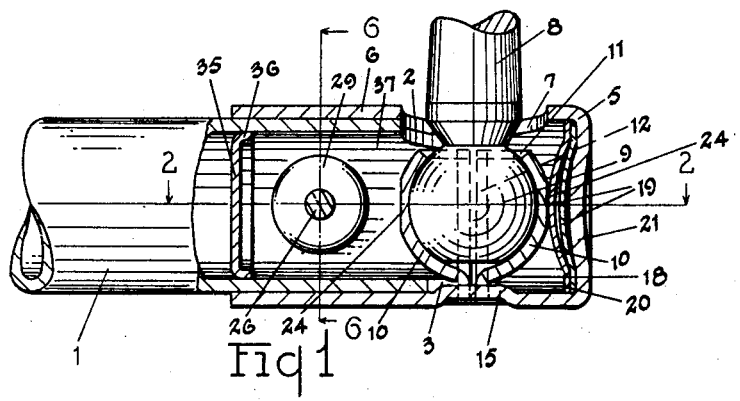
Aug. 16, 1932.   B. H. URSCHEL   1,872,099
LINK
Filed Jan. 23, 1930

1,872,099

UNITED STATES PATENT OFFICE

BERTIS H. URSCHEL, OF BOWLING GREEN, OHIO, ASSIGNOR TO URSCHEL ENGINEERING COMPANY, OF TOLEDO, OHIO, A CORPORATION OF OHIO

LINK

Application filed January 23, 1930. Serial No. 422,690.

My invention has for its object to provide a means for interconnecting machine elements where one of the elements is preferably formed of exceedingly light weight material and, notwithstanding, provide in the combination a means of transmitting a relatively large force or pressure.

The invention particularly provides a means for interconnecting two relatively oscillatable angularly movable members, one of the members being of a tubular construction and wherein means is provided for sustaining the stresses and strains at the point of connection. The invention also provides an efficient construction that may be formed of die pressed parts and, consequently, can be cheaply made and assembled.

In the preferred form of construction, the invention is particularly adaptable for use in connection with tie rods, drag links, and in automobile constructions which are usually connected to movable parts of an automobile by ball and socket joints. It is also adaptable wherein tie rods or links must necessarily be formed to transmit compression as well as tension strains which necessitates that such members be stiff and rigid and wherein it is desirable that they be exceedingly light in weight to reduce the strains produced by vibration which invariably occurs in connection with such constructions.

As is well known in connection with links heretofore used, particularly in automobiles, the links are invariably provided with a threaded wall in which is located a threaded plug used for clamping a spherical head of a part to which the link is connected. Where the link is formed tubular, threading the wall invariably weakens it and the constantly changing stresses eventually cause fracture. By my invention the spherical head is secured in position without threading the ends of the tubular link and, consequently, the link may be formed of light weight tubular stock.

The invention may be contained in structures that vary in their details and which may be used for different purposes. To illustrate a practical application of the invention, I have selected a link embodying the invention as an example, and shall describe the link selected hereinafter. The link referred to is shown in the accompanying drawing.

Fig. 1 is a view of a longitudinal section of one end of the link. Fig. 2 is a view of a section taken on the plane at right angles to the plane of the section shown in Fig. 1. Fig. 3 is a side view of a semi-spherical plate forming a part of a socket for the spherical head of the member to which the link is connected. Fig. 4 is a view of a section of the semi-spherical plate shown in Fig. 3. Fig. 5 is a view of a section of a cap that covers the end of the link. Fig. 6 is a view of a transverse section through a part used for interconnecting the cap to the end of the link.

In the form of construction shown in the drawing, the link 1 is formed of relatively light weight tubular stock and has a recess 2 cut from the side wall at the end of the link, and a recess 3 also cut from the side wall at the end of the link at a point substantially opposite to the recess 2. The edge of the recess 2 is substantially semi-circular in its projection on a horizontal plane located tangential to the link 1 at the point of the deepest part of the recess 2 from the end of the link 1, while the recess 3 is rectangular in its form and its center is located in the plane extending through the axis of the link, and the deepest point of the recess 2, as measured from the end of the link. A cap 5, having an extended flange or sleeve 6, covers the end of the link 1. The sleeve 6 tightly fits the exterior surface of the end of the link 1. The cap 5 has a hole 7 that in its projection onto the plane tangential to the cylindrical surface of the sleeve 6, has a diameter substantially the same as that of the recess 2 and, when the cap 5 is placed in position on the link 1, the recess 2 and the hole 7 register with each other. The connecting member 8 extends through the hole 7 and the recess 2 and is secured within the end of the link and the cap 5.

The member 8 is provided with a spherical head 9 located within the end of the link 1 and within the cap 5. The openings 7 and 2 afford angular movement of the shank or member 8 to permit angular movements of the link 1 relative to the member 8. The head 9 is secured in a substantially cylindrical socket that is in turn secured within the end of the link 1 and the cap 5. The cylindrical socket is formed of two substantially hemispherical discs 10 that are so formed that when placed together they leave a space for angular movement of the member 8 relative to the link 1.

The hemispherical discs 10 are provided with flanges 12 that extend around the edges of the hemispherical discs except along the edge portions that form the opening 11. When the substantially hemispherical discs are placed together, the flanges 12 abut or make contact with each other and form on their interior a spherical surface corresponding to the spherical surface of the head 9. The hemispherical discs 10 are provided with notches 13 that are located in the flanges 12 and the cap 5 is provided with an inwardly extending protuberance 15 that may be formed by depressing the sheet metal of the sleeve 6 inwardly. The inwardly extending raised portion 15 extends into and tightly fits the recess 3 of the link 1 and the notches 13 formed in the flanges 12 of the hemispherical discs 10, which prevents angular movement of the cap 5 relative to the body portion of the link and prevents angular movement of the discs within the end of the link 1 and the cap 5 by movement of the spherical head 9.

The discs 10 are secured in position between the end of the link 1 which abuts the flange 12 of the inner of the hemispherical discs 10 and a spring member 18 that is located intermediate the outer end of the cap and the outer of the hemispherical discs 10. The spring member 18 may be formed of two dished discs 19 having peripheral portions 20 that make contact with each other, the peripheral portion of the outer of the said dished discs 19 making contact with the end of the cap 5. The inner of the dished discs 19 is, preferably, provided with a sharper curvature than the outer of the dished discs 19 and the cap 5 is provided with a central dished portion 21 of the curvature less than the outer of the dished discs 19. This forms an exceedingly efficient and highly resistant elastic member for yieldingly resisting the movements of the hemispherical discs due to tensile force that may be transmitted from the member 8 to the link 1. The outer of the hemispherical discs 10 may be provided with a flattened portion 24 where it makes contact with the inner of the central dished discs 19 to prevent local depression of the inner of the dished discs 19.

The cap 5 is secured in position so as to elastically hold the hemispherical discs 10 against the end of the link 1 by means of the bolt 26. Preferably, the link 1 and the sleeve 6 of the cap 5 are provided with openings 27 and 28 in which a pair of sockets 29 are located. The sockets 29 have flanged edges 30 that engage the edges of the openings 28 in the sleeve 6 of the cap 5. The head 31 of the bolt 26 is located in one of the sockets 29 while the nut 32 is located in the other of the sockets. The cap 5 is forced onto the end of the link 1 and they are secured together by means of the bolt which extends through the bottoms of the sockets 29.

The end of the link 1 may be provided with a disc 35 that may be formed to have a flange 36 that fits the inner surface of the link 1 and forms within the end of the link 1 and the cap 5, a chamber 37 for containing a lubricant for lubricating the spherical head 9 and the hemispherical discs that enclose the head. Suitable cover plates may be used for covering the opening 7 to prevent the escape of the lubricant.

I claim:

In a tubular link, a cap for closing the end of the tubular link and having an opening, a member extending through the opening and having a spherical head located within the cap, a pair of sheet metal hemispherical discs substantially surrounding the said head and having flanges, the end of the tubular link abutting the flange of one of the hemi-spherical discs, a spring located intermediate the end of the cap and the other of the hemi-spherical discs for pressing the head between the hemi-spherical discs, the cap and the flanges of the hemi-spherical discs having indented registering portions for preventing rotation of the hemi-spherical discs with the said member.

In witness whereof I have hereunto signed my name to this specification.

BERTIS H. URSCHEL.